United States Patent
Wray et al.

(10) Patent No.: US 10,372,909 B2
(45) Date of Patent: Aug. 6, 2019

(54) DETERMINING WHETHER PROCESS IS INFECTED WITH MALWARE

(71) Applicant: HEWLETT PACKARD ENTERPRISE DEVELOPMENT LP, Houston, TX (US)

(72) Inventors: Michael John Wray, Bristol (GB); Nigel Edwards, Bristol (GB)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 293 days.

(21) Appl. No.: 15/241,502

(22) Filed: Aug. 19, 2016

(65) Prior Publication Data

US 2018/0052997 A1    Feb. 22, 2018

(51) Int. Cl.
*G06F 21/52*    (2013.01)
*G06F 21/56*    (2013.01)

(52) U.S. Cl.
CPC ............ *G06F 21/566* (2013.01); *G06F 21/52* (2013.01); *G06F 2221/033* (2013.01)

(58) Field of Classification Search
CPC ... G06F 21/566; G06F 21/52; G06F 2221/033
See application file for complete search history.

(56) References Cited

U.S. PATENT DOCUMENTS

| | | | |
|---|---|---|---|
| 8,352,484 B1 * | 1/2013 | Schneider | G06F 21/565 707/758 |
| 8,448,243 B1 | 5/2013 | Sankruthi et al. | |
| 8,479,296 B2 | 7/2013 | Mashevsky et al. | |
| 8,584,235 B2 * | 11/2013 | Topan | G06F 21/563 726/22 |
| 8,925,089 B2 * | 12/2014 | Sallam | G06F 21/554 726/22 |
| 8,935,789 B2 * | 1/2015 | Shukla | G06F 21/568 713/164 |
| 8,984,331 B2 * | 3/2015 | Quinn | G06F 11/0709 714/4.2 |
| 9,294,486 B1 * | 3/2016 | Chiang | H04L 63/14 |
| 9,355,247 B1 * | 5/2016 | Thioux | G06F 21/55 |
| 9,392,016 B2 * | 7/2016 | Sallam | G06F 21/52 |
| 9,483,644 B1 * | 11/2016 | Paithane | G06F 16/128 |
| 9,594,912 B1 * | 3/2017 | Thioux | G06F 21/577 |
| 9,652,616 B1 * | 5/2017 | Bhatkar | G06F 21/566 |
| 9,690,938 B1 * | 6/2017 | Saxe | G06F 21/563 |

(Continued)

OTHER PUBLICATIONS

Yiheng Duan et al., "Detective: Automatically Identify and Analyze Malware Processes in Forensic Scenarios via DLLs," IEEE ICC 2015—Next Generation Networking Symposium, 2015, pp. 5691-5696, IEEE.

(Continued)

*Primary Examiner* — Joseph P Hirl
*Assistant Examiner* — Stephen T Gundry
(74) *Attorney, Agent, or Firm* — Hewlett Packard Enterprise Patent Department

(57) ABSTRACT

Example implementations relate to determination as to whether a process is infected with malware. For example, in an implementation, information of a process extracted from a snapshot of system memory is obtained. A determination as to whether the process is infected with malware is made based on a process model.

16 Claims, 15 Drawing Sheets

(56) References Cited

U.S. PATENT DOCUMENTS

| | | | |
|---|---|---|---|
| 9,910,986 B1* | 3/2018 | Saxe | G06F 21/563 |
| 9,922,192 B1* | 3/2018 | Kashyap | G06F 21/566 |
| 9,928,366 B2* | 3/2018 | Ladnai | G06F 21/56 |
| 9,998,484 B1* | 6/2018 | Buyukkayhan | H04L 63/1416 |
| 2007/0240217 A1* | 10/2007 | Tuvell | G06F 21/56 726/24 |
| 2007/0240218 A1* | 10/2007 | Tuvell | G06F 21/56 726/24 |
| 2010/0031361 A1* | 2/2010 | Shukla | G06F 21/567 726/24 |
| 2011/0041179 A1* | 2/2011 | St Hlberg | G06F 21/566 726/23 |
| 2011/0265182 A1 | 10/2011 | Peinado et al. | |
| 2012/0144490 A1 | 6/2012 | Hartrell et al. | |
| 2012/0255013 A1* | 10/2012 | Sallam | G06F 21/554 726/24 |
| 2013/0111591 A1* | 5/2013 | Topan | G06F 21/563 726/24 |
| 2014/0068326 A1* | 3/2014 | Quinn | G06F 11/0709 714/15 |
| 2014/0325656 A1* | 10/2014 | Sallam | G06F 21/52 726/24 |
| 2015/0256552 A1 | 9/2015 | Lee et al. | |
| 2016/0078225 A1* | 3/2016 | Ray | G06F 21/554 726/23 |
| 2016/0080399 A1* | 3/2016 | Harris | H04L 63/1416 726/23 |
| 2016/0080417 A1* | 3/2016 | Thomas | H04L 63/20 726/1 |
| 2016/0080418 A1* | 3/2016 | Ray | H04L 63/20 726/1 |
| 2016/0094564 A1* | 3/2016 | Mohandas | H04L 63/145 726/24 |
| 2016/0164901 A1* | 6/2016 | Mainieri | G06N 7/005 726/23 |
| 2016/0180090 A1* | 6/2016 | Dalcher | G06F 21/566 726/23 |
| 2016/0212159 A1* | 7/2016 | Gupta | G06F 21/54 |
| 2016/0381051 A1* | 12/2016 | Edwards | H04L 63/1416 726/23 |
| 2017/0006049 A1* | 1/2017 | Muttik | H04L 63/1416 |
| 2017/0032120 A1* | 2/2017 | Tolpin | G06F 21/53 |
| 2017/0061126 A1* | 3/2017 | Hooks | G06F 21/52 |
| 2017/0083702 A1* | 3/2017 | Gathala | G06F 21/552 |
| 2017/0147819 A1* | 5/2017 | Vasilenko | G06F 21/566 |
| 2017/0149804 A1* | 5/2017 | Kolbitsch | H04L 63/1416 |
| 2017/0171229 A1* | 6/2017 | Arzi | H04L 63/1416 |
| 2017/0171230 A1* | 6/2017 | Leiderfarb | H04L 63/1441 |
| 2017/0193230 A1* | 7/2017 | Jevnisek | G06F 21/564 |
| 2017/0195353 A1* | 7/2017 | Taylor | H04L 67/22 |
| 2017/0206357 A1* | 7/2017 | Gorelik | G06F 21/52 |
| 2017/0243000 A1* | 8/2017 | Shraim | G06F 21/53 |
| 2017/0300690 A1* | 10/2017 | Ladnai | G06F 21/554 |
| 2017/0372068 A1* | 12/2017 | Zimmerman | G06F 21/563 |
| 2018/0039776 A1* | 2/2018 | Loman | G06F 21/54 |

OTHER PUBLICATIONS

Antonio Bianchi et al., "Blacksheep: Detecting Compromised Hosts in Homogeneous Crowds," CCS'12, Oct. 16-18, 2012, Raleigh, North Carolina, USA, pp. 1-12, ACM.

Manoun Alazab et al., "Malware Detection Based on Structural and Behavioural Features of API Calls," Proceedings of the 1st International Cyber Resilience Conference, Aug. 23, 2010, Edith Cowan University, Perth Western Australia, pp. 1-11, Edith Cowan University.

Matthew G. Schultz et al., "Data Mining Methods for Detection of New Malicious Executables," Proceedings 2001 IEEE Symposium on Security and Privacy, May 14-16, 2001, Oakland, CA, USA, pp. 1-12, IEEE.

S. Momina Tabish et al., "Malware Detection using Statistical Analysis of Byte-Level File Content," CSI-KDD'09, Jun. 28, 2009, Paris, France, pp. 1-9, ACM.

Usukhbayar Baldangombo et al., "A Static Malware Detection System Using Data Mining Methods," Aug. 13, 2013, pp. 1-13, Cornell University Library.

Youngjoon Ki et al., "A Novel Approach to Detect Malware Based on API Call Sequence Analysis," Research Article, International Journal of Distributed Sensor Networks, Apr. 4, 2015, pp. 1-9, vol. 2015, Article ID 659101, Hindawi Publishing Corporation.

Nappa et al., "Driving in the Cloud: An Analysis of Drive-by Download Operations and Abuse", DIMVA'13 Proceedings of the 10th international conference on Detection of Intrusions and Malware, and Vulnerability Assessment, 2013, 20 pages.

A. White, Identifying the Unknown in User Space Memory, 2013, Queensland University of Technology, pp. 1-175 (Year: 2013).

"Cuckoo Sandbox", available online at <https://web.archive.org/web/20160625053131/https://github.com/cuckoosandbox/cuckoo>, Jun. 22, 2016, 2 pages.

* cited by examiner

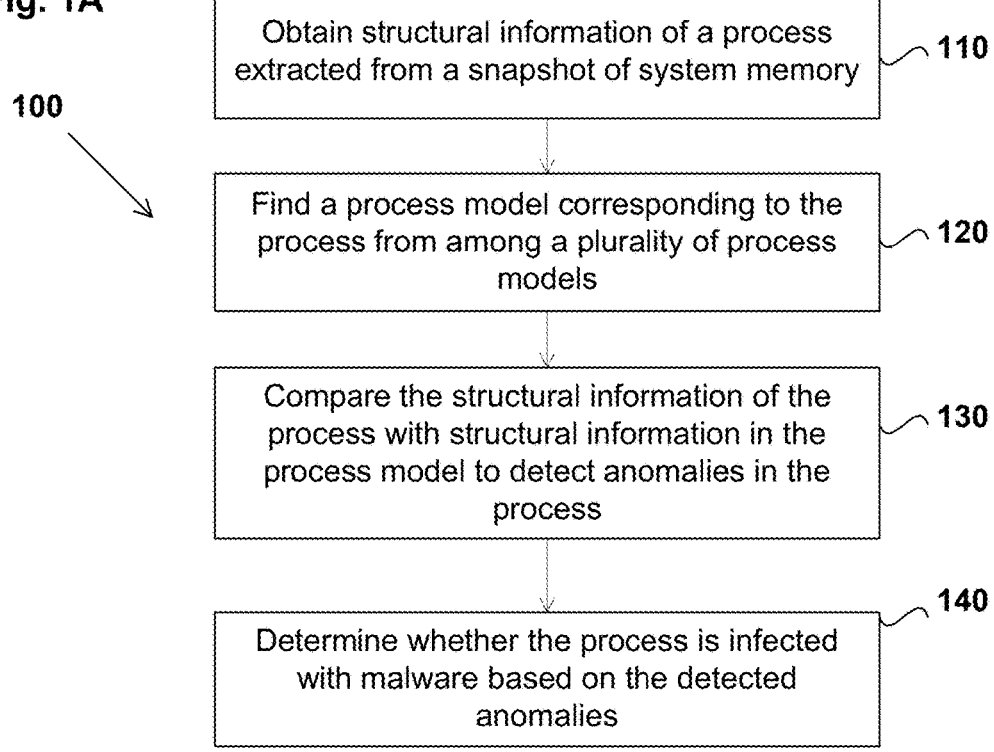

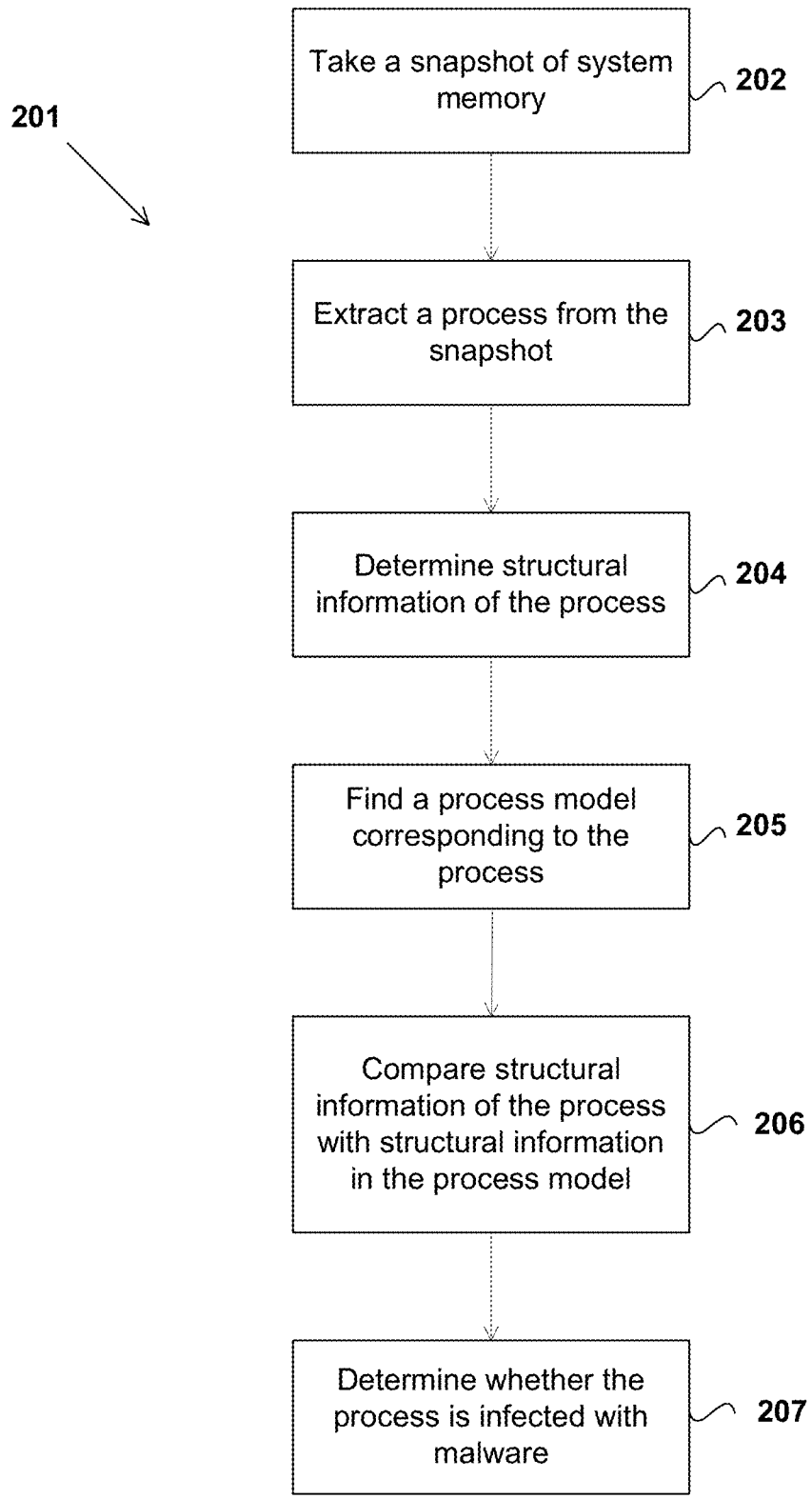

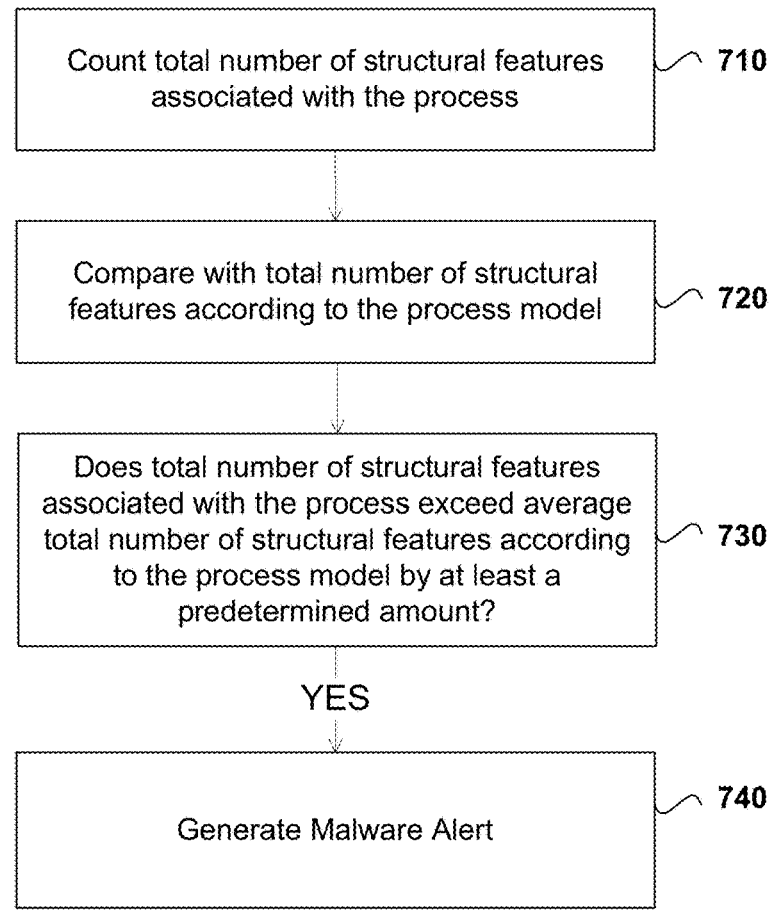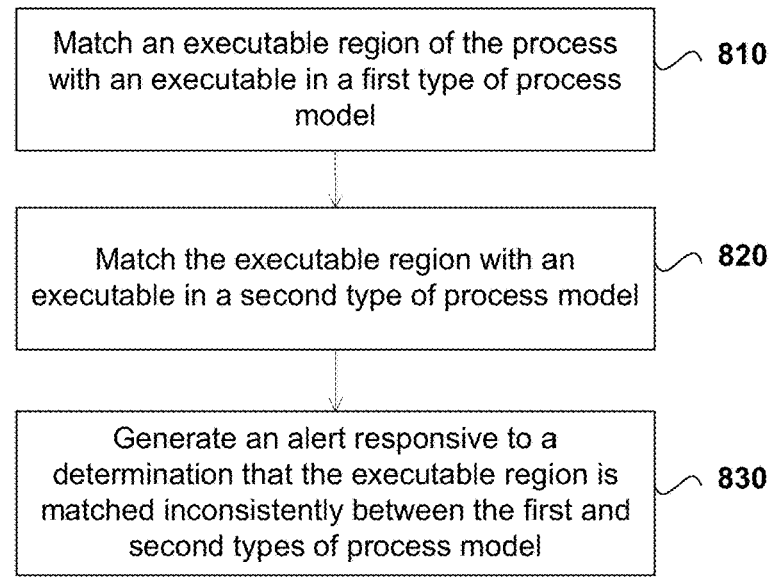

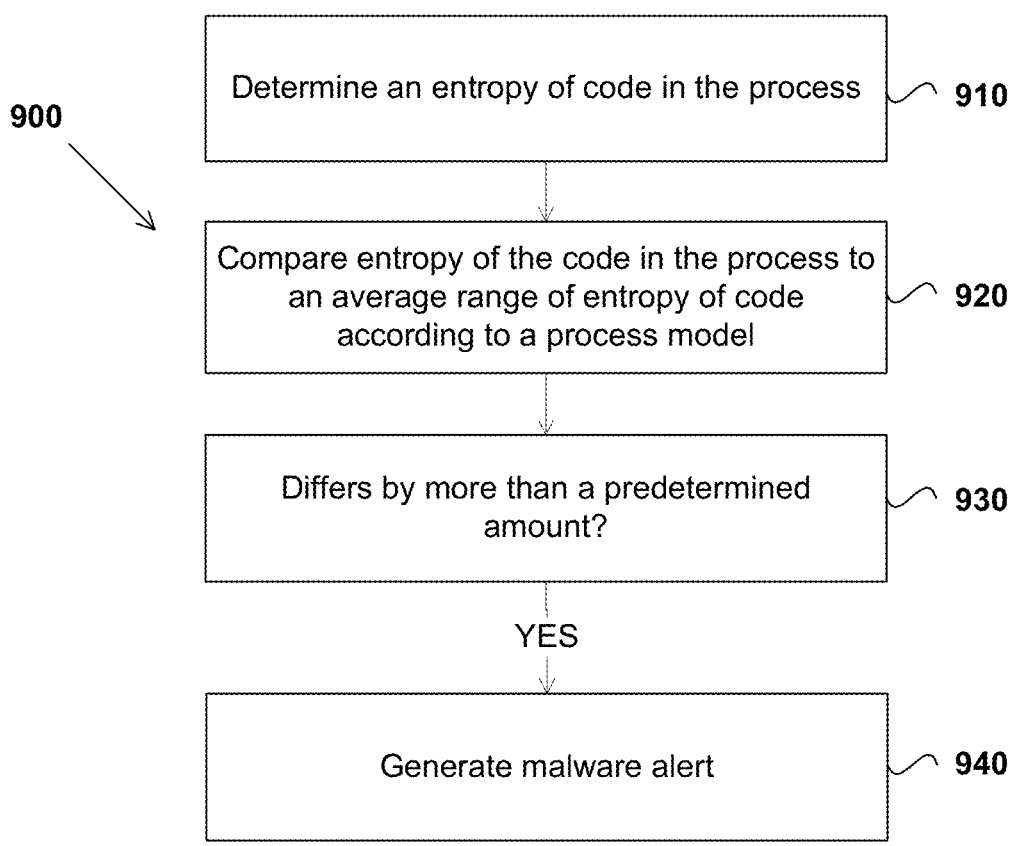

DETERMINING WHETHER PROCESS IS INFECTED WITH MALWARE

BACKGROUND

Malware refers to hostile or intrusive software, including computer viruses, worms, trojan horses, ransomware, spyware, adware, scareware, and other malicious programs. Malware may be used for data exfiltration, financial fraud, intellectual property theft and other nefarious purposes. One approach for detecting malware is to scan files for sequences of bytes, known as signatures, which are associated with known malware.

BRIEF DESCRIPTION OF THE DRAWINGS

Examples of the present disclosure will now be described, by way of non-limiting example only, with reference to the accompanying drawings, in which:

FIG. 1A shows an example of a method of determining if a process is infected with malware according to the present disclosure;

FIG. 2A shows another example of a method of determining if a process is infected with malware according to the present disclosure;

FIG. 7 shows an example method of generating a malware alert according to an example of the present disclosure;

FIG. 8 shows an example method of determining that an executable region of a process is matched inconsistently between two different types of process model according to an example of the present disclosure;

FIG. 9 shows an example of generating a malware alert according to an example of the present disclosure;

DETAILED DESCRIPTION

Figure 1B:
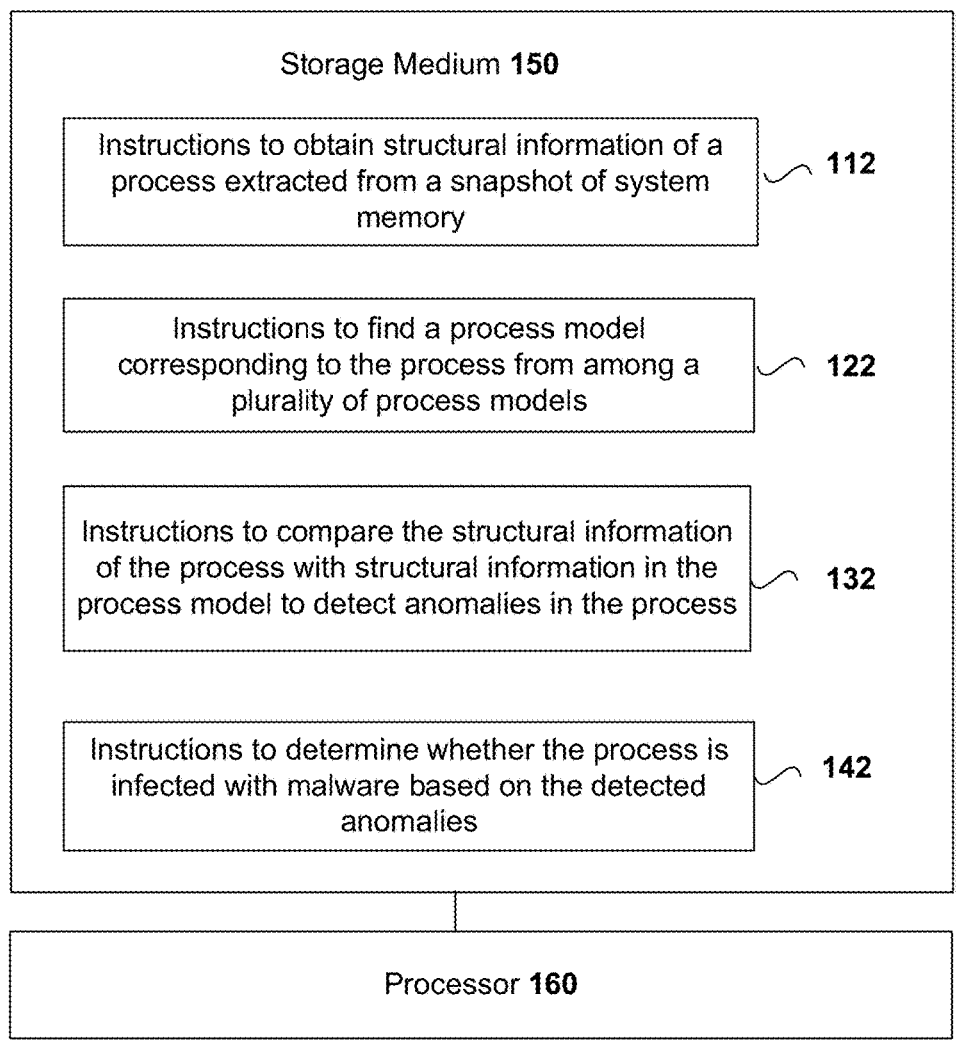
FIG. 1B shows an example of a non-transitory storage medium storing instructions to determine if a process is infected with malware according to the present disclosure.

A process is an instance of a computer program which is being executed in system memory. For example, a process may be an instance of application software. A process may inhabit a user address space in system memory. The process may include executable regions hosting executables and data regions hosting data. An executable is a module of executable code which may include instructions which are executable by a processor, such as a central processing unit (CPU) of a computer. A library is a special type of executable, which is explained in more detail later. References in this disclosure to executables should be interpreted broadly to include libraries, as well as other types of executable, unless the context indicates otherwise.

One approach to detect malware is to scan files for sequences of bytes, known as signatures, but malware authors are aware of this approach and therefore frequently repackage their malware to change its signatures and thus avoid detection. Further, in order to hide itself in memory, malware may use various techniques including process hollowing, dynamic link library (DLL) injection and application programming interface (API) hooking. In process hollowing the malware starts a normal process such as Explorer.exe in suspended mode, copies itself into the memory of the suspended process overwriting the existing in-memory executable and then resumes the process which is now infected with malware. As the name of the process remains the same, the user just sees the normal process (e.g. Explorer.exe) running.

In DLL injection, the malware allocates a new region of memory in each process it wishes to inject, copies itself into that region and starts a thread inside the new memory region. Thus while the injected process may include the original content, the injected process also hosts a malware thread. The user is unlikely to see any symptom while using common system tools. API hooking involves replacing the first few bytes of library routines such as HttpSendRequest and InternetReadFile to redirect the call into the injected DLL where credentials and other information are stolen, before jumping back into the original library routine so the library routine executes normally.

The above techniques all involve making changes to executable regions of system memory. Even while attempting to hide within a process, malware needs to make certain changes to the process in order for the malware to operate. These changes may alter the structure of the process. The present disclosure proposes obtaining structural information of a process from a snapshot of system memory and determining whether the process is infected with malware based on this structural information. The structural information may for example include libraries, executables, entropy of code or other structural features associated with the process.

One aspect of the present disclosure comprises obtaining structural information of a process extracted from a snapshot of system memory and comparing the structural information of the process with structural information in a process model which includes a model of a clean version of the process. In the context of this disclosure, a clean version of the process means a version of the process which is not infected with malware. Based on this comparison, a determination may be made as to whether the process is infected with malware. For instance, a significant number, or certain type, of anomalies in the process compared to the process model may be indicative of malware.

FIG. 1A shows a computer implemented method 100 of detecting malware according to one example. At block 110 structural information of a process extracted from a snapshot of system memory is obtained. The process may be a process that was running in system memory of a computer system which is being examined to detect malware. In this context, extracted means that some or all contents of the process, or information relating to the process was obtained from a snapshot of system memory.

In this respect, the method of the present disclosure (e.g., method 100) may differ from static malware detection methods which scan a file on a hard disk or solid state drive, because the method according to the present disclosure examines information derived from a process loaded into system memory. The method of the present disclosure also may differ from dynamic malware detection methods which detect operations carried out by an executing process over an extended period of time, as the method of the present disclosure is based on information derived from a snapshot of system memory at a particular point in time.

The structural information of the process may be abstract information about the structure of the process, which is at a higher level than sequences of bytes or individual executable instructions. For example, the structural information may include, but is not limited to, any of the following: a list of libraries associated with the process, a list of executables associated with the process, a total number of libraries and/or executables associated with the process, a measure of the entropy of code of the process, a metric related to the structure of data regions of the process etc.

The method 100 of FIG. 1A may run on the computer system which is being examined to detect malware, or the method 100 may be run on a separate computer system from the computer system which is being examined to detect malware. If the method is run on the computer system which is being examined, then obtaining the structural information may include scanning the system memory of the computer system to obtain a snapshot, extracting a process from the snapshot and determining structural information of the extracted process. If the method of FIG. 1A is run on a separate computer system than the one under examination, then obtaining the structural information may include receiving the structural information from the computer system under examination. In another example, the computer system implementing the method of FIG. 1A may receive a full or partial snapshot of system memory from the computer system under examination and determine the structural information from the snapshot.

At block 120, a process model corresponding to the process is found from among a plurality of process models. A snapshot of system memory may include many processes, for example several hundred different processes. It may be desired to examine each of these processes using the method of FIG. 1A to determine whether any of them are infected with malware. Therefore, there may be a large number of process models corresponding to the possible processes. Each respective process model may include a model of a clean version of the process which it corresponds to.

At block 120, a process model which matches the extracted process is found from among the plurality of process models. E.g. if the extracted process is Explorer.exe then the extracted process may be matched with an Explorer.exe process model which includes structural information of a clean version of Explorer.exe. However, the matching is not necessarily by name of the process and may be based on other criteria, as will be explained in more detail later.

At block 130, structural information of the process is compared with structural information of the process model to detect anomalies in the process. An anomaly is a difference between the structural information of the process model and the structural information of the process. For instance, if a structural feature is present in the process but not present in the process model, this may count as an anomaly. Other types of anomaly are possible and will be discussed in more detail later.

At block 140, the computer system executing the method determines whether the process is infected with malware based on the detected anomalies. Here and elsewhere in this disclosure, 'determining that the process is infected with malware' should be interpreted broadly to include not just a definitive determination, but also a determination that the process is likely to be infected with malware, such that further investigation is warranted.

If the method determines that the process is infected with malware, then the method may generate an alert. The alert may be, but is not limited to, any of the following: a message to a system administrator, a message to a user of the computer system, creating an entry in a log, triggering further operations to verify that malware is present, analyze or cleanse the malware, etc. Similar references to an alert or malware alert made elsewhere in this disclosure may be interpreted in the same manner.

FIG. 1B shows a set of instructions, stored on a non-transitory storage medium 150, which may be executed by a processor 160 to perform the method of FIG. 1A. The processor may for example be a central processing unit (CPU), microprocessor or other electronic processing device. The storage medium may for example be a hard disk, flash drive, memory, etc., of a computer system. The instructions 112, 122, 132 and 142 in FIG. 1B correspond to method blocks 110, 120, 130 and 140 of FIG. 1A respectively and cause the method blocks to be implemented when executed by processor 160.

Figure 2B:
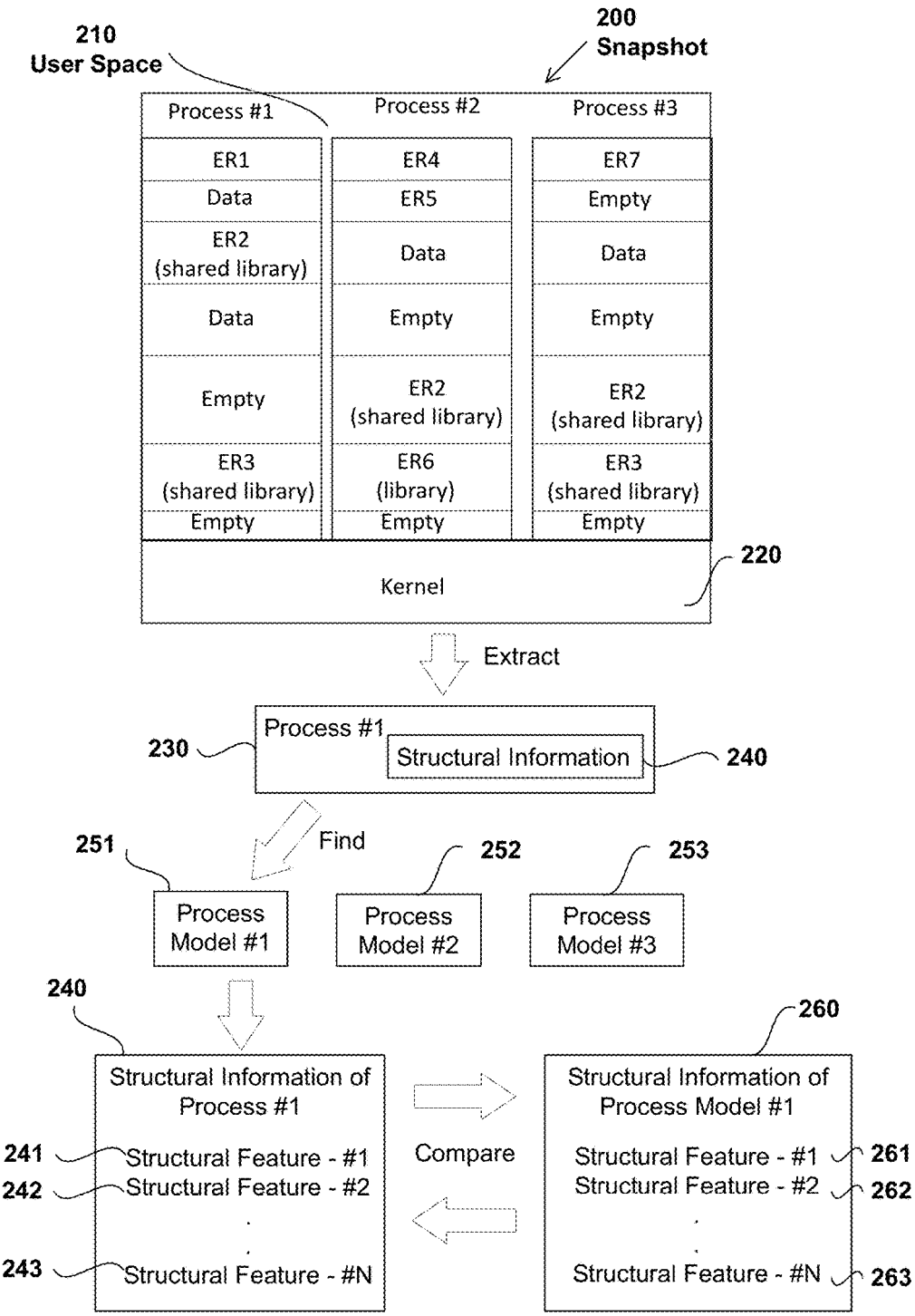
FIG. 2B shows an example snapshot of system memory according to the present disclosure.

FIG. 2A shows a further example method of detecting malware and may be read together with FIG. 2B, which illustrates the method graphically, with reference to an example of a snapshot of system memory. As shown in FIG. 2B, a snapshot of system memory 200 may include user space 210 and a kernel 220. The user space 210 is user address space in the system memory and may include a plurality of processes. A process is an instance of a computer program which is being executed in system memory. For example, a process may be an instance of application software. A process typically includes a main executable and may include a number of other executables. The main executable is an executable that controls the flow of the process and which may call libraries or other executables to perform certain functions.

The kernel 220 is the core of an operating system and may handle interactions between the processes in user space and the CPU, memory and/or peripheral devices. The kernel 220 may manage allocation of user space to the processes. The kernel is resident in a dedicated kernel space, which is a region of system memory reserved for the kernel. The kernel 220 may include a process list of all the processes running in user space and pointers to the address space which each process occupies. The kernel may also include a module list for each process. A module list of a process includes a list of the executables associated with the process and pointers to the locations of the executables in user space.

The example snapshot of system memory in FIG. 2B includes three processes: Process #1, Process #2 and Process #3. However, it is to be appreciated that there may be fewer or more processes and in many cases the user space may include hundreds of processes. Each process may comprise any number of executable regions, data regions and/or empty regions. Executable regions contain executable code, data regions contain data and empty regions are empty. For instance, Process #1 includes first, second and third executable regions ER1, ER2 and ER3, as well as data regions and empty regions.

Each executable region may include an executable. An executable is a set of encoded instructions that may be executed by a processor. The executable may have been loaded into system memory from a file, for example a file on a disk or other storage medium.

A library is a special type of executable which may interact with other executables in a predefined manner, through a set of predefined function calls for example. In addition to executable code, a library may also include templates, data or other resources. As the function calls and responses to function calls follow a predefined format, a library may be used by a plurality of different executables in a process. References in this disclosure to executables should be interpreted broadly to include libraries, as well as other types of executable, unless the context indicates otherwise.

A shared library is a library which may be used by a plurality of processes, i.e. a library shared by the processes. A dynamic linked library (DLL) is one example of a type of shared library in the Windows operating system. Shared libraries may be used to perform common functions such as dialog boxes, saving files, making HTTP request etc. Libraries may be used to make system calls to the kernel and thus provide a simple interface through which programmers may access the kernel functions.

Executable regions may contain strings of executable code that are not associated with an executable in the processes module list in the kernel. For example, these strings of executable code may have been dynamically generated, rather than loaded from a file. Such strings of executable code are considered to be executables, but differ from executables loaded from a file on a disk or other storage medium, in that they do not have a file or pathname.

The data in data regions may be data generated by, operated on, manipulated by, or otherwise used by the executables and/or other executable code of the process. The empty regions may be regions that are reserved by the process so that they may be potentially be filled with data or executables etc. later, but at the time of taking the snapshot, they were empty.

Referring to the example of FIG. 2B, Process #1 includes first, second and third executable regions ER1, ER2 and ER3. The first executable region ER1 may be a main executable of Process 1. The second and third executable regions ER2 and ER3 in this example are occupied by shared libraries, which may be used by other processes. Process #2 includes a main executable in executable region ER4, another executable in executable region ER5 and a library, which is not a shared library, in executable region ER6. The library in ER6 may be used by the executables in ER4 and ER5 of Process #2, but may not be used by the executables of other processes. Process #3 includes a main executable in ER7 and two shared libraries in executable regions ER2 and ER3.

Shared libraries ER2 and ER3 are shown as belonging to several processes. While the shared libraries could be copied into separate respective regions of memory for each process, in most cases each shared library may occupy just one region in user address space and each process using a shared library may include pointers to the executable region containing the shared library.

The method 201 of FIG. 2A, like the method of FIG. 1A, may be executed by processor or several processors and may be stored as a set of machine readable instructions on a non-transitory storage medium.

At block 202, a snapshot is taken of the system memory 200. For example, this may be accomplished by a computer system saving a copy of the contents of its system memory. The snapshot represents the contents of the system memory at a particular point in time.

At block 203, a process 230 is extracted from the snapshot. For example, FIG. 2B shows process #1 as being extracted. In the context of this disclosure, extracting the process simply means that information of the process is obtained from the snapshot. In one example, the contents of executable regions of the process and/or related metadata from the kernel are extracted for further analysis. In one example, data regions and/or metadata relating to the data regions are also extracted. In other examples, the data regions and/or metadata relating to the data regions are not extracted so as to save processing time by focusing on the executable regions.

In one example, a location of the process list in the kernel may be found from a process control block of the kernel of the snapshot. A process, such as process 1, may be identified in the process list and the executable regions of the process may be located based on the module list of the process in the kernel. The executable regions or metadata relating to the executable regions of the process may then be extracted.

At block 204, structural information 240 of the extracted process 230 is determined. In order to speed up the method, block 204 may analyze the executable regions and/or related metadata, but not the data regions and empty regions, when determining the structural information.

The structural information 240 may be determined based on the executable regions of the extracted process and/or related metadata. For example, the structural information may include structural features of the process. The structural features may for example include a list of executables, a list of libraries and/or other structural features of the process. In one example, each structural feature may be represented by an identifier such as a name, hash, fuzzy hash or other identifier. Determining the structural information may include determining structural features and identifiers of the structural features.

Block 205 of FIG. 2A corresponds to block 120 of FIG. 1A. At block 205, a process model 251 corresponding to the extracted process 230 is found from among a plurality of process models 251, 252, 253. For instance, the process models 251, 252, 253 may be stored in a database or elsewhere and may include a process model #1 which is a model of a clean version of process #1, a process model #2 which is a model of a clean version of process #2 and a process model #3 which is a model of a clean version of process #3. In this example the extracted process #1 (230) is matched with process model #1 (251).

At block 206, structural information 240 of the extracted process is compared with structural information 260 of the corresponding process model 251, which represents a clean version of the process. As shown in FIG. 2B the structural information 240 of the process 230 may include a plurality of structural features 241, 242, 243 and the structural information 260 of the process model 251 may include a plurality of structural features 261, 262, 263. Thus, the comparison may include comparing structural features 241, 242, 243 of the process 230 with structural features 261, 262, 263 of the process model 251. The comparison may include detecting anomalies in the process 230, or determining a degree of similarity between the process and the process model etc.

At block 207, based on the comparison in block 206, a determination is made as to whether or not the process is likely to be infected with malware. For example, a determination that the process is infected with malware may be in response to detecting a large number, or particular type, of anomalies.

Block 202 is carried out on the computer system being examined to detect malware. Blocks 203-207 may be carried out on either the computer system being examined, or on a remote computer system such as a server or a computer system of a security service provider. In one example, blocks 202-204 are carried out on the computer system being examined, while blocks 205-207 are carried out on a remote computer system; in which case, the remote computer system obtains the structural information 240 of the extracted process by receiving the structural information from the computer system under examination.

Figure 3:
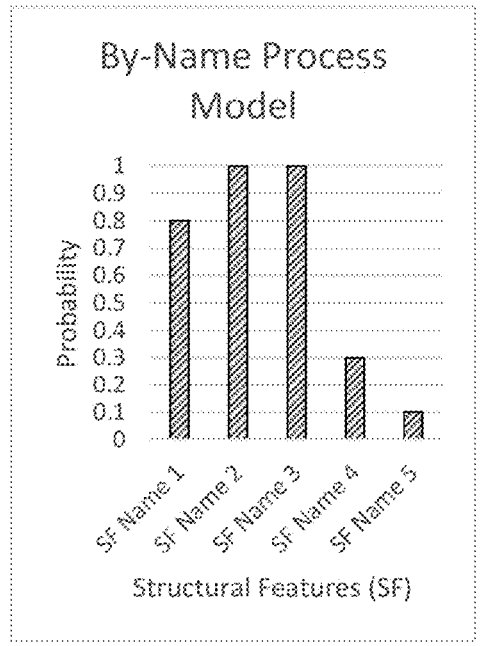
FIGS. 3(a) to 3(c) show examples of process models according to the present disclosure.
Figure 3:
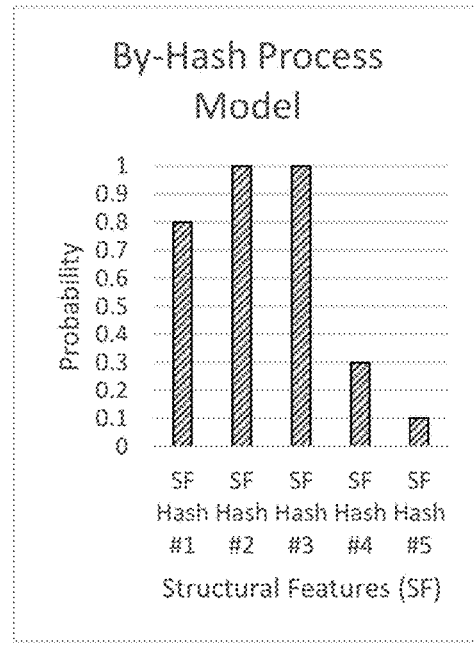
Figure 3:
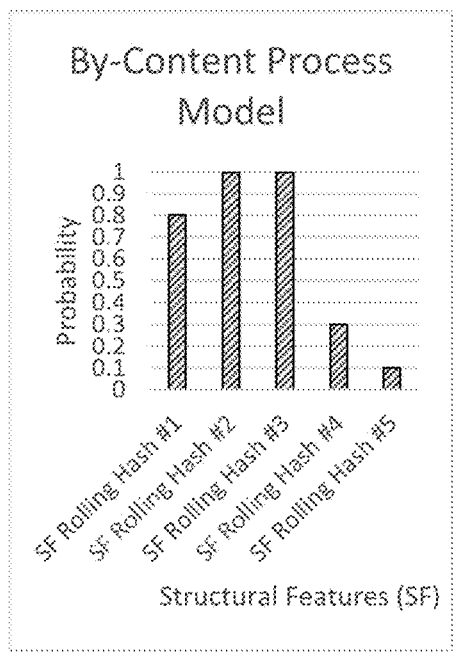

FIGS. 3(*a*) to 3(*c*) show illustrative examples of the structural information which may be included in the process models. In these examples, the process models include statistical information, such as probabilities of occurrence of particular structural features in a clean version of the process.

An application program stored as a file on a disk may comprise a consistent set of executable code. While different version numbers of the software may differ from each other, the same version should be the same on different machines. However, when a process is loaded into system memory and executed, some natural variance occurs depending upon the operation system, configuration of the computer system and any other processes running in user space. Therefore a snapshot of a particular process, such as Explorer.exe, may differ between different computer systems, or even differ when run on the same computer system at different times or under different conditions.

Accordingly a structural feature may sometimes be present in a clean version of a process and sometimes may not be present. Therefore a probability of occurrence may be assigned to each structural feature in the process. For instance an executable named Explorer.exe may have 100% probability of occurrence in a clean version of the Explorer.exe process, but certain libraries or other executables may sometimes be present and other times not, and so have a lower probability of occurrence. The process model and probabilities of occurrence of structural features may be built up based on a large number of snapshots of clean versions of the process running on a plurality of different computer systems, or based on one or several snapshots of the process taken of the computer system under examination at an earlier time, when the computer system was known, or presumed, to be clean and not infected by malware.

Structural features may be identified and compared in various different ways. Accordingly, there may be several different types of process model. FIG. 3(*a*) shows a by-name process model, in which the process and the structural features of the process are identified by name. The process may be matched with the corresponding by-name process model based on the name of the process. The name of the process may for example be a name, pathname or partial pathname of the main executable of the process. The model may, in some examples, include a plurality of variations of the name, pathname or partial pathname which may be matched. Likewise, each structural feature of the process may be identified by a name, such as an executable name or library name, which may be a name, pathname or partial pathname, etc.

In the illustrated example, there are five structural features, but in other examples there may be more or fewer structural features in the process model. Merely by way of example, structural feature #1 has as probability of occurrence of 80%, structural features #2 and #3 both have a probability of 100%, structural feature #4 has a probability of 30% and structural feature #5 has a probability of 10%. If the extracted process includes a structural feature which is not in the process model, or which has a low probability of occurrence, this may count as an anomaly. Likewise if the process model includes a structural feature which has a high probability of occurrence, but is not present in the extracted process, this may count as an anomaly.

FIG. 3(*b*) shows a by-hash process model, in which the process and structural features of the process are identified by hash. A hash is the result of a hash function which maps data of arbitrary size, in this case the contents of the process, or the contents of an executable region, to data of fixed size. The hash of a main executable of a process may be taken as the hash of the process. The hash of a structural feature, such as an executable, is effectively an identifier of the structural feature based on the content of the structural feature. In order to determine a match between a process and a process model, the method may require an exact match between the hash of the process and the hash of the process model. In order to determine a match between structural features, the method may require an exact match between the hash of a structural feature in the extracted process and a structural feature in the process model. The hash function may be any appropriate hash function, such as but not limited to SHA-1, SHA-2, SHA-3, SHA-256, BLAKE, BLAKE2, Whirlpool, Tiger or another hash function recommended by The National Institute of Standards and Technologies.

In one example, the method of the present disclosure may determine a hash of an executable by determining the pathname from which the executable was loaded and applying a hash function to the file at the pathname. The file may be stored on a disk or other secondary storage medium. In other examples the hash of an executable may be found in, or derived from, metadata of the file from which the executable was loaded, or metadata of the memory snapshot. In terms of building up the process model, the hashes in the process model may be based on hashes calculated from previous snapshots of the process on the same or other computer systems, based on online databases of hash functions for known executables or libraries, and/or based on digital signatures of the executables or libraries.

FIG. 3(*c*) shows a by-content process model. The by-content process model is similar to the by-hash model, but is based on a measure of content similarity. For example, the by-content process model may use fuzzy hashes. A fuzzy hash is a hash produced by a fuzzy hash function. A fuzzy hash function is a hash function for which similar inputs produce the same or similar hashes. This is different to most hash functions, such as SHA-1, which may produce very different hashes for two inputs having minor differences. A comparison between two fuzzy hashes may produce a percentage similarity or other similar metric. Thus, an exact correspondence between two fuzzy hashes is not required for them to match, but rather a degree of similarity is calculated between the fuzzy hashes of the process and the process model, or between the fuzzy hashes of respective structural features, and they are deemed to match if the similarity is within a predetermined distance.

The by-content process model may include fuzzy hashes calculated based on a process and its component executable regions, extracted from previous snapshots of the same, or other, computer systems. The by-content process model may include clusters of similar content extracted from previous snapshots. When each member of a content cluster has a similar fuzzy hash they may be considered variations on the same executable content. Fuzzy hashes of the content clusters in the process model may be compared to a fuzzy hash of an executable in a process extracted from a snapshot of system memory of the computer system being examined for malware. In one example a rolling hash function is used to create the fuzzy hash. A rolling hash is a hash function whose input is generated from a window moving through the content of an executable region of the process.

The by-content model with fuzzy hash matching makes it possible to identify and match not only libraries and executables loaded from a file, but also dynamically generated strings of executable code and other executables which have not been loaded from a file, or which are not in the module list of the process and which could not otherwise easily be matched.

Comparison of an extracted process with by-name, by-hash and/or by-content process models may detect executables or other structural features which are present in the extracted process, but not present in the corresponding process model. If a library, or other executable, is present in the extracted process but not in the process model, this anomaly may be due to malware creating new malicious executables in the process through DLL injection. In other cases, a library may be present in the extracted process, but no the process model, due to the malware loading a library which is not malicious in itself, but which is not usually loaded by the process in question and which the malware needs to perform a certain function. Such anomalies may be indicative of malware.

The by-hash and by-content process models are helpful, as they can detect anomalies which may be difficult to detect using the by-name process model. For instance, if malware has hollowed out a process or changed the content of an executable while leaving the name the same, then this may be detected by the by-hash or by-content process models.

A determination as to whether the process is infected with malware is made based on the comparison with the process model. For example, the comparison may detect anomalies in the process, and a determination may be made on the basis of the detected anomalies. Example are shown in method 400 of FIG. 4 and method 500 of FIG. 5.

Figure 4:
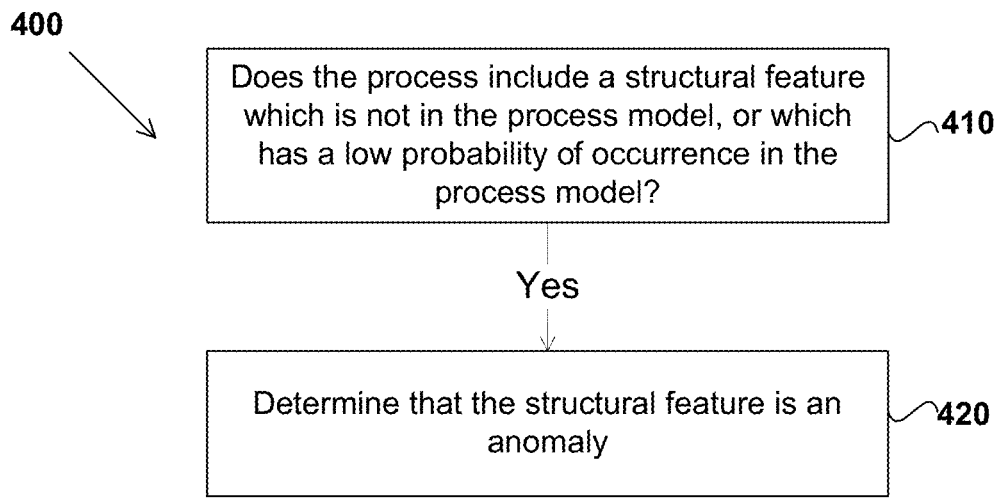
FIG. 4 shows an example method of detecting an anomaly in a process according to the present disclosure.

At block 410, of FIG. 4, a determination is made as to whether the process includes a structural feature which is not in the process model, or which has a low probability of occurrence in the process model. At block 420, it is determined that the structural feature which is not in the process model, or which as a low probability of occurrence, is an anomaly. A low probability may be defined as a probability below a predetermined threshold. In other examples, other differences may be determined to be anomalies. For instance, structural features which have a high probability of occurrence in the process model (e.g. 100% or higher than a predetermined threshold), but which are not in the process may be counted as an anomaly. In other examples, differences between corresponding structural features in the process and the process model may count as an anomaly.

Figure 5:
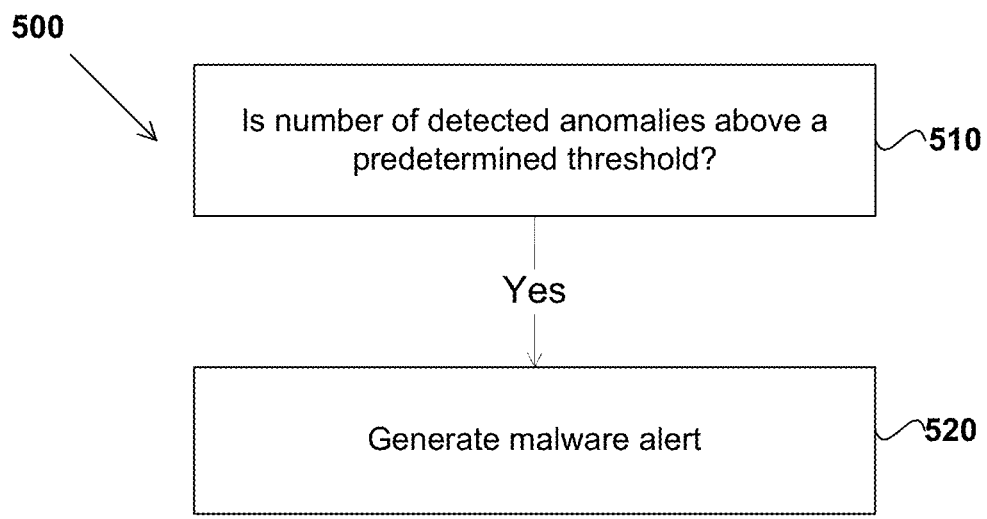
FIG. 5 shows an example of method of generating a malware alert according to an example of the present disclosure.

At block 510 of FIG. 5, it is determined whether the total number of detected anomalies is above a predetermined threshold. At block 520, a malware alert is generated in response to the total number of anomalies being above the predetermined threshold. For example, a much larger than normal number of executables may be indicative of DLL injection and/or malware activity using a large number of libraries. The predetermined threshold may vary depending upon the process, i.e. for some processes a greater number of anomalies may be tolerated, while for other processes a lower degree of variability will trigger the malware alert.

In other examples, different types of anomalies may have different weights and an alert may be generated if the weighted total is above a predetermined threshold. In still other examples, certain types of detected anomaly may always generate a malware alert.

Figure 6:
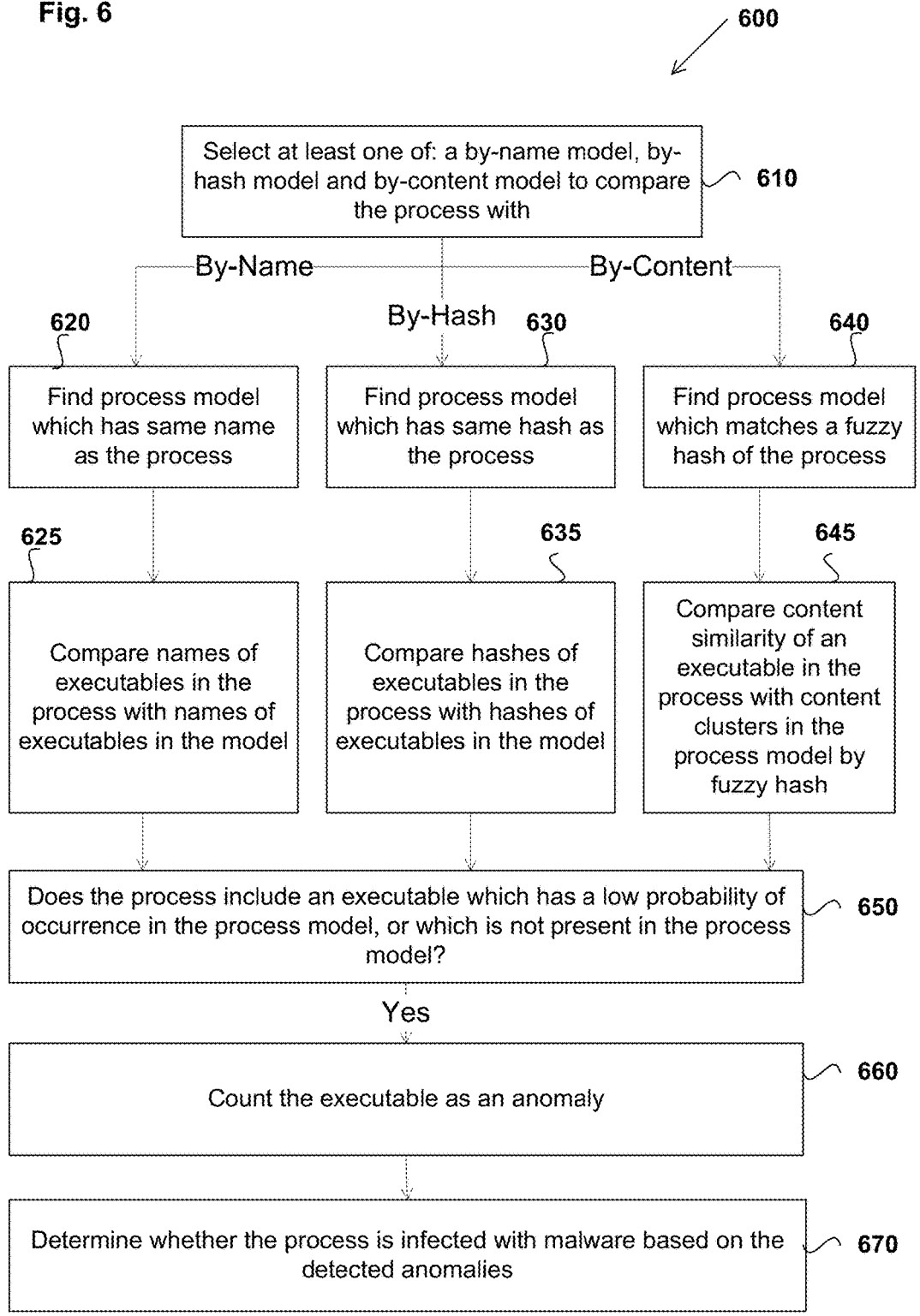
FIG. 6 shows an example of a method of determining if a process is infected with malware using a by-name process model, by-hash process model or by content-process model according to the present disclosure.

FIG. 6 shows a computer implemented method 600 of detecting malware which may make use of any of a number of different types of process model.

At block 610, a choice is made as to which of the by-name, by-hash or by-content process models to compare the process with. It may be possible to compare the process with one type of process model, or with several types of process model, or all types of process model.

If a by-name process model is chosen, then the method proceeds to block 620. At block 620, a process model having the same name as the process is found. For instance, a database may be searched to find a process model having the same name as the process. Thus, for the by-name process model, the name acts as the identifier of the process. The name may be the name, pathname or partial pathname of the main executable of the process. A by-name process model may include several variations of a name which are considered to be a match. In this way variations in the path or version may still be considered to match.

Once a matching process model is found, at block 625, names of executables in the process are compared with names of executables in the process model. Thus, in the by-name model, names of structural features are used as identifiers of the structural features. The names may be names, pathnames or partial pathnames of the structural feature. In general any executable or library will have a pathname if they were loaded from disk, solid state drive or other secondary storage medium.

If a by-hash process model is chosen then the method proceeds to block 630. At block 630, a process model having the same hash as the process is found. For instance a database may be searched to find a process model having the same hash as the process. Thus, for the by-hash process model, the hash acts as the identifier of the process. The hash may for example be a hash of the main executable of the process.

Once a matching process model is found, at block 635, hashes of executables in the process are compared with hashes of executables in the process model. Thus, in the by-hash model, hashes of structural features are used as identifiers of the structural features. In one example, an exact correspondence between hashes is required to determine a match. The hashes may for example be hashes of executable files from which the executables were loaded into memory, as described above.

If a by-content process model is chosen then the method proceeds to block 640. At block 640, a process model having a fuzzy hash match with the process is found. A fuzzy hash algorithm may determine a content similarity between the fuzzy hash of the process and the fuzzy hash of the process model and may determine a match when the degree of similarity is within a predetermined range. For instance, a database may be searched to find a process model having a fuzzy hash match, within a predetermined range, of the process. The fuzzy hash of the process may be a fuzzy hash of all executable regions associated with the process or a fuzzy hash of the main executable.

In one example, the fuzzy hash is a rolling hash. A rolling hash is a hash resulting from a hash function whose input is generated from a window moving through the content of an executable region of the process. Some rolling hashes may be calculated relatively rapidly thus facilitating comparison by-content similarity of structural features of a process with structural features of a process model. Such comparison, based on fuzzy hash, may be carried out much more quickly than byte to byte comparison and may detect a degree of similarity even if the exact order or sequence of bytes has some variance. Examples of fuzzy hash functions include but are not limited to Ssdeep and the Nilsimsa Hash function.

Once a matching process model is found, at block 645 fuzzy hashes of structural features are matched with fuzzy hashes of structural features in the process model. For example, fuzzy hashes may be used to compare an executable regions of the extracted process with content clusters in the process model. Thus, in the by-content process model, fuzzy hashes are used as the identifiers, but due to the fuzzy hash matching, exact matches with fuzzy hashes of the process are not required. The by-content model using fuzzy hashes allows regions of executable code in the process which were not loaded from a file, do not have a name, or which are not signed, to be compared with the process model. For instance, dynamically generated strings of code which do not have a pathname and which are not signed, may be compared with a process model by using fuzzy hash matching.

The same as the other process models, the by-content process model may be built up based on a large number of snapshots of clean versions of the process running on a plurality of different computer systems, or based on one snapshot, or several snapshots of the process taken by the computer system under examination at an earlier time, when the computer system was known, or presumed, to be clean and not infected by malware.

Building up the by-content process model may involve renormalizing the snapshots which the process model is based on to compensate for address space layout randomization (ASLR). ASLR randomizes the location in address space of executables in a process and this may affect the fuzzy hash of executables. Renormalizing means reloading the executable into a predetermined address space, which may for example be near the middle of the available possible address spaces. In this way, the fuzzy hashes calculated for the by-content process model may approximate the average and form a good baseline with which to compare the fuzzy hashes of the executable regions of an extracted process.

The by-name, by-hash and by-content models all proceed to block 650.

At block 650 a determination is made as to whether the process includes an executable which has a low probability of occurrence in the process model, or which is not present in the process model.

At block 660 such executables are counted as anomalies.

At block 670 a determination is made as to whether the process is infected with malware based on the detected anomalies.

Anomalies indicating presence of malware may be detected in other ways, based on comparing, by a computer system, the structural information of the process with the structural information of the process model, as will now be described with reference to FIGS. 7 to 9.

The method 700 of FIG. 7 shows an example in which a determination may be made based on the total number of structural features.

At block 710, the total number of structural features associated with the process is counted.

At block 720, the total number of structural features present in the process is compared with the total number of structural features according to the process model.

At block 730, a determination is made whether the total number of structural features associated with the process exceeds the average total number of structural features according to the process model by at least a predetermined amount.

If the determination at block 730 is positive, then a malware alert is generated at block 740.

While the by-name, by-hash and by-content process models in this disclosure are described as separate process models, it is to be understood that in some examples they may be linked together. For instance, for any by-name process model it may be possible to find the corresponding by-hash or by-content process model and vice versa. Likewise for any structural feature in a by-name process model it may be possible to find the corresponding structural feature in a by-hash or by-content process model and vice versa. Accordingly, a check may be made for consistency of matches between the different types of process model. An example is shown in method 800 of FIG. 8.

At block 810, an executable region of the process is matched with an executable in a first type of process model, for instance one of the by-name, by-hash or by-content models.

At block 820, the executable region of the process is matched with an executable in a second type of process model. The second type of process model is different from the first type of process model. For instance, the second type of process model may be another one of the by-name, by-hash or by-content models.

At block 830, an alert is generated in response to a determination that the executable region is matched inconsistently between the first and second types of process model. For instance, if an executable region including a library crypt.dll was found to match with a library crypt.dll in the by-name process model, but according to the by-content process model the executable region did not match with the library crypt.dll in the by-content model, this may indicate that the library crypt.dll has been altered by malware.

Another structural feature that may be taken into account is the entropy of code. An example is shown in method 900 of FIG. 9.

At block 910, entropy of code in the process is determined. The entropy may be determined by any appropriate method. In one example, the entropy is determined based on the compressibility of the code. For instance, the code may be compressed to a zip file and the degree of compression determined. A low degree of compression may indicate a high complexity of code and thus a high degree of entropy.

At block 920, entropy of the code in the process is compared to an average range of entropy of code according to a process model.

At block 930, it is determined whether the entropy of code in the process and the average range of entropy of code in the process model differ by more than a predetermined amount.

If the difference is more than the predetermined amount then at block 940 a malware alert is generated.

A similar method may be carried out for comparing entropy of code in each executable region with the process model, rather than entropy of code of the process as a whole.

Figure 10A:
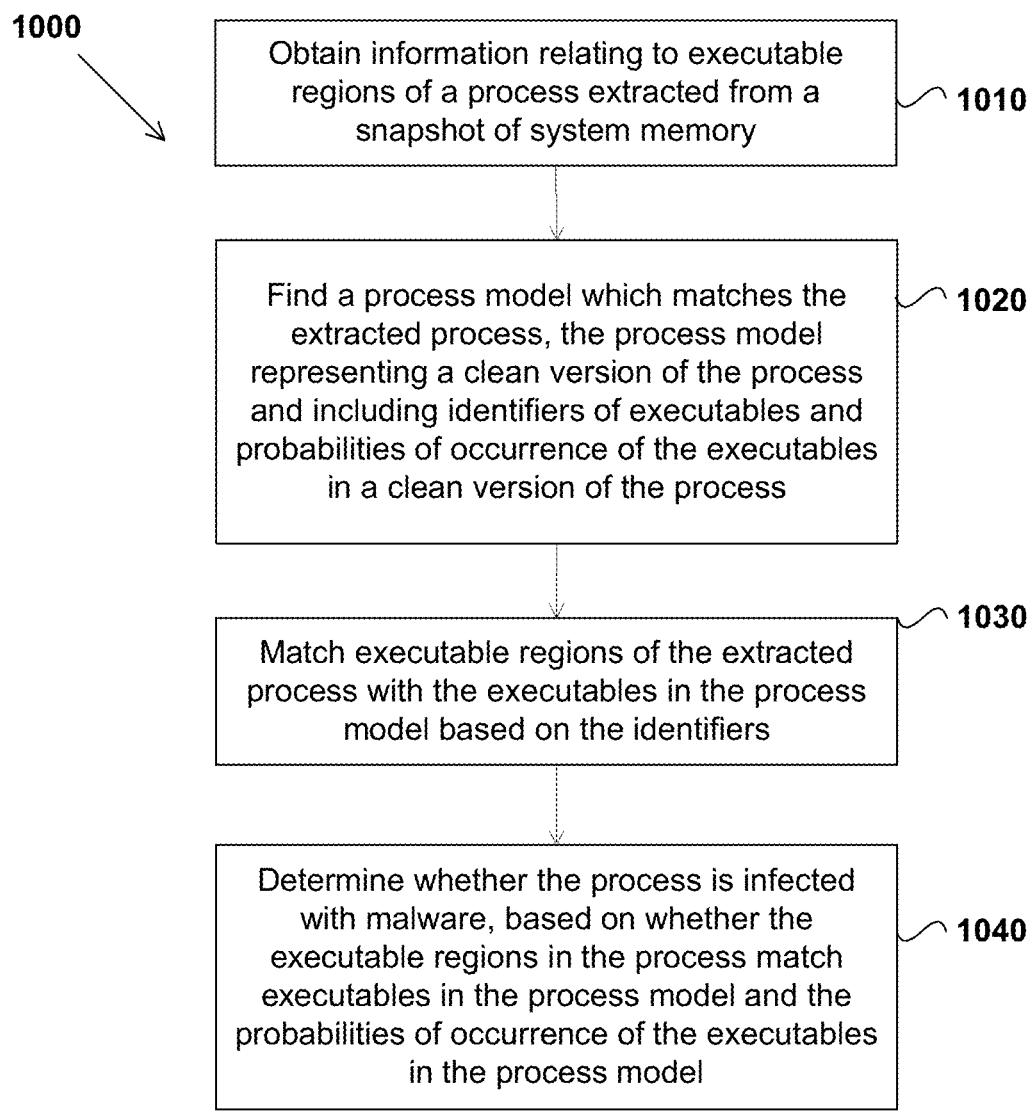
FIG. 10A shows an example method of determining if a process is infected with malware according to an example of the present disclosure.

FIG. 10A, is flow diagram illustrating another computer implemented method 1000 of detecting malware according to the present disclosure.

At block 1010, information relating to executable regions of a process extracted from a snapshot of system memory is obtained.

At block 1020, a process model which matches the extracted process is found. The process model represents a clean version of the process and includes identifiers of executables and probabilities of occurrence of the executables in a clean version of the process. The identifiers may for example be names, hashes or fuzzy hashes as discussed above.

The matching of the process with a process model may be on the basis of an identifier of the process. The identifier of the process may be an identifier of a main executable of the process. The identifier may for example be a name, hash or fuzzy hash. The matching may comprise finding a process model with an identifier which matches the identifier of the process.

At block 1030, executable regions of the extracted process are matched with the executables in the process model based on identifiers of executables in the executable regions and identifiers of executables in the process model.

At block 1040, it is determined whether the process is infected with malware, based on whether the executable regions in the process match executables in the process model and the probabilities of occurrence of the executables in the process model. For example, a significant number of executable regions in the process which do not match with an executable in the process model or which match with executables having low probabilities of occurrence may be indicative of infection by malware.

Figure 10B:
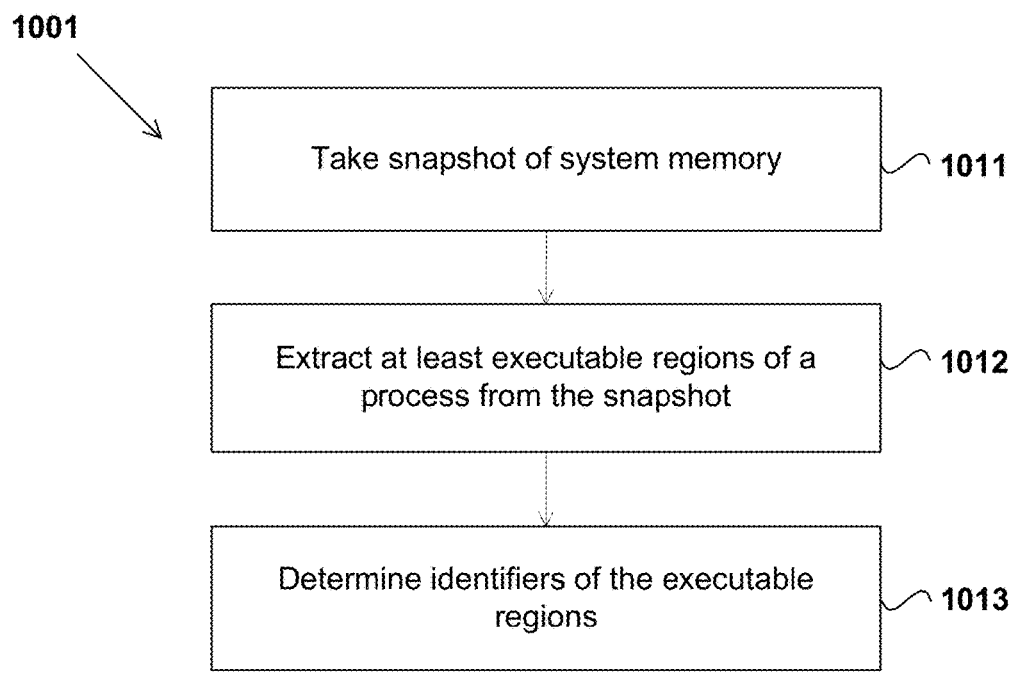
FIG. 10B shows an example method which includes taking a snapshot of system memory according to the present disclosure.

FIG. 10B shows an example of a computer implemented method 1001 of obtaining information relating to the executable regions of a process. The method may be carried out on a computer system being examined to detect malware.

At block 1011, the computer system takes a snapshot of system memory. For instance a processor of the computer system may copy the contents of system memory to a file.

At block 1012, executable regions relating to a process are extracted from the snapshot. Extracted means that the executable regions are obtained from the snapshot. For example a processor may identify a process in the snapshot, determine the location of executable regions of the process and create a file comprising the executable regions of the process. Other information, such as metadata relating to the process may be extracted from the process or the kernel in the snapshot. In this way, in some examples, data regions of the snapshot may be discarded as they may not be relevant to the malware detection process.

At block 1013, the identifiers of the executable regions of the process are determined. For example, the identifiers may be names, hashes or fuzzy hashes of executables associated with the executable regions. As data regions and other irrelevant data may be discarded at block 1012, block 1013 may be carried out efficiently.

The identifiers of the executable regions obtained in block 1013 may be used as the information relating to the executable regions of the process in block 1010 of FIG. 10A. In one example, the method of FIG. 10B is carried on a computer system being examined for malware, which passes the information to a remote computer system which carries out the detection in accordance with the method of FIG. 10A. In another example the computer system being examined for malware also carries out the detection method of FIG. 10B. In still other examples block 1011 of FIG. 10B may be carried out on the computer system being examined, while one or both of blocks 1012 and 1013 are carried out on a remote computer system which implements the method of FIG. 10A.

Figure 11:
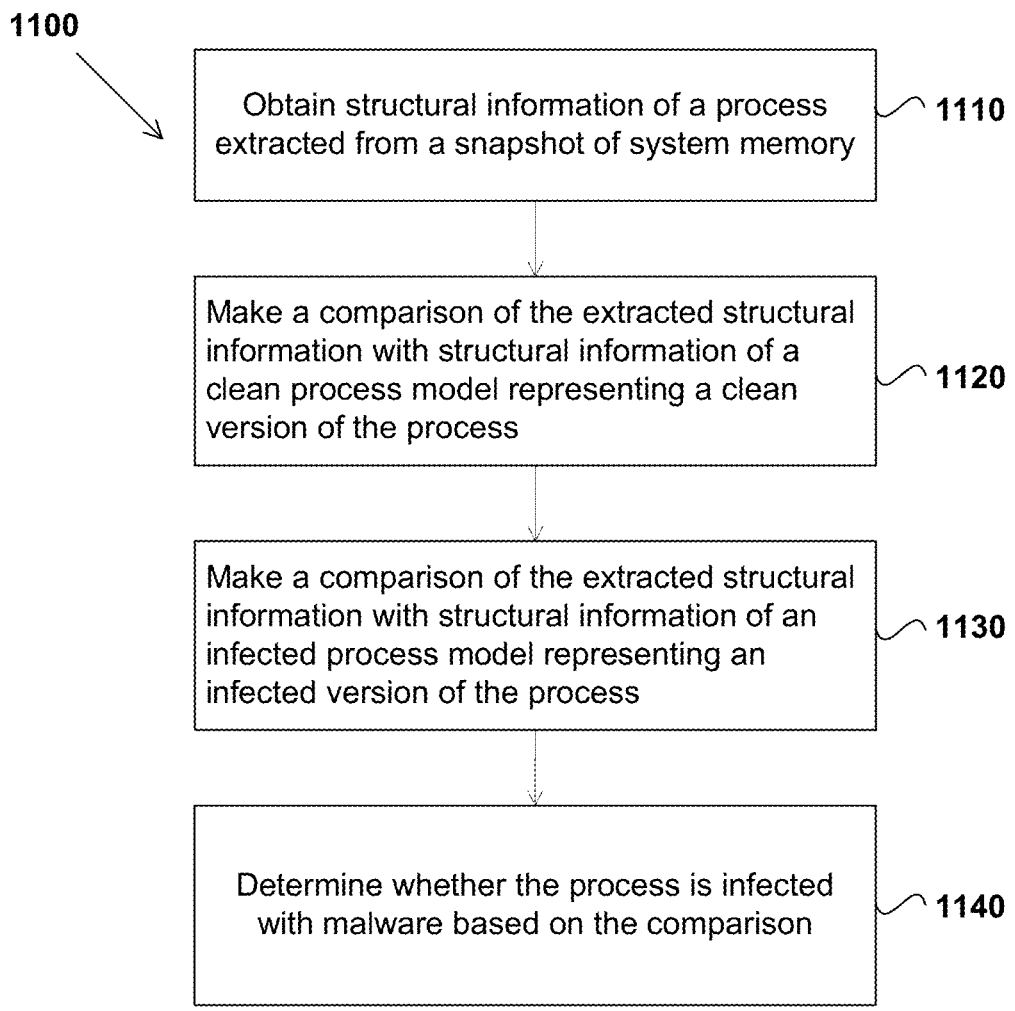
FIG. 11 shows an example method of determining if a process is infected with malware according to the present disclosure.

FIG. 11 shows another example of a computer implemented method 1100 of detecting malware.

At block 1110, structural information of a process extracted from a snapshot of system memory is obtained. Block 1110 may be analogous to block 110 of FIG. 1A.

At block 1120, the extracted structural information is compared with structural information of a clean process model representing a clean version of the process.

The clean process model may be stored in a database of process models and may be a by-name, by-hash or by content process model as described in the methods above. The process may be matched with the clean process model in accordance with any of the methods described above, for instance the methods of FIG. 1A, FIG. 2A or FIG. 6.

At block 1130, the extracted structural information is compared with structural information of an infected process model representing an infected version of the process.

The infected process model may be stored in a database of process models and may be a by-name, by-hash or by content process model as described in the methods above. The process may be matched with the infected process model in accordance with any of the methods described above, for instance the methods of FIG. 1A, FIG. 2A or FIG. 6. The infected process model may be based on information about malware previously detected by a security service provider, shared malware databases, etc. There may be separate infected process models for each malware or species of malware infecting a process, or multiple forms of malware may be included in the same infected process model.

At block 1140, it is determined whether the process is infected with malware based on the comparison.

For instance, a determination may be made whether the process is more similar to the clean process model or more similar to the infected process model, based on the structural features.

As with the method of FIG. 10A, the method of FIG. 11 may be carried out on the computer system being examined for malware, or on a remote computer system which receives the information from the snapshot.

Figure 12:
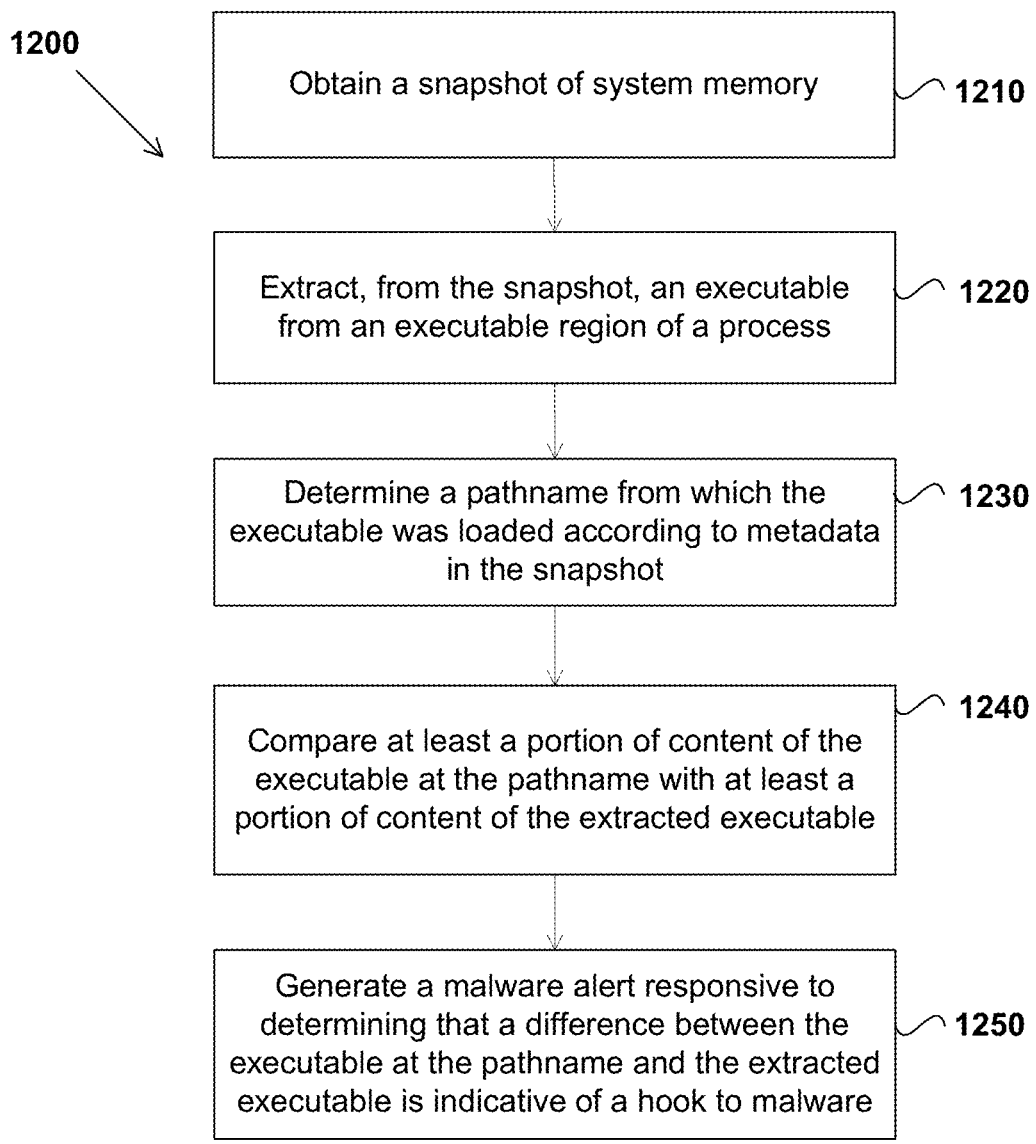
FIG. 12 shows an example method of generating a malware alert according to the present disclosure.

FIG. 12 shows a further example computer implemented method 1200 of detecting malware. This method may be used to detect application program interface (API) hooking.

At block 1210, a snapshot of system memory is obtained.

At block 1220, an executable is extracted from an executable region of a process which forms part of the snapshot. The executable may be a library.

At block 1230, a pathname from which the executable was loaded is determined according to metadata in the snapshot.

For example, a pathname of a memory mapped file relating to the extracted executable may be found in the kernel or in a module list of the process.

At block 1240, at least a portion of the content of the executable at the pathname is compared with at least a portion of the content of the extracted executable.

For example, the executable may be loaded into memory from the pathname and compared with the executable which has been extracted from the snapshot. At least a portion of the extracted executable may be compared with at least a corresponding portion of the loaded executable. For instance, the initial portion of each function in the extracted executable could be compared with the initial portion of each function in the loaded executable. A function is a section of executable code which performs a specific task. Hooks to malware are usually found within the first few lines of a function. Therefore, if the extracted executable includes a hook in the initial portion of a function, while the executable loaded directly from the pathname does not, then this may indicate the executable in the snapshot was infected with malware which injected a malicious hook. It is also possible to check the whole content of the extracted executable for hooks which do not exist in the loaded executable, however checking the whole content is more time and processor intensive.

At block 1250, a malware alert is generated in response to determining that a difference between the executable at the pathname and the extracted executable is indicative of a hook to malware.

For instance, it may first be determined if the difference is due to a hook, and if a hook is found, the hook may be examined to determine whether the hook links to an executable which is known to be safe. In one example, if the hook is to an executable which is named and signed then the hook is considered to be safe, but otherwise it is considered to be likely to hook to malware. Signed means that the executable is signed by a secure key, to identify the executable as originating from a trusted source.

In another example, the pathnames of executables (including libraries) which are to be loaded into a process may be determined based on a main executable file from which the process is loaded. The executable file may include a list of pathnames of executables which are to be loaded into the process. These pathnames may be compared with the pathnames of executables which are actually loaded into the process according to the snapshot of system memory. In the event of an anomaly between the two a malware alert may be generated. For example, where an executable is loaded into system memory, but loaded executable has a pathname different from that specified in the main executable file, this may indicate that malware has used API hooking, or another method, to load the executable for nefarious purposes.

Any of the methods described herein may be stored as a set of machine readable instructions on a non-transitory storage medium and executed by a processor.

Figure 13:
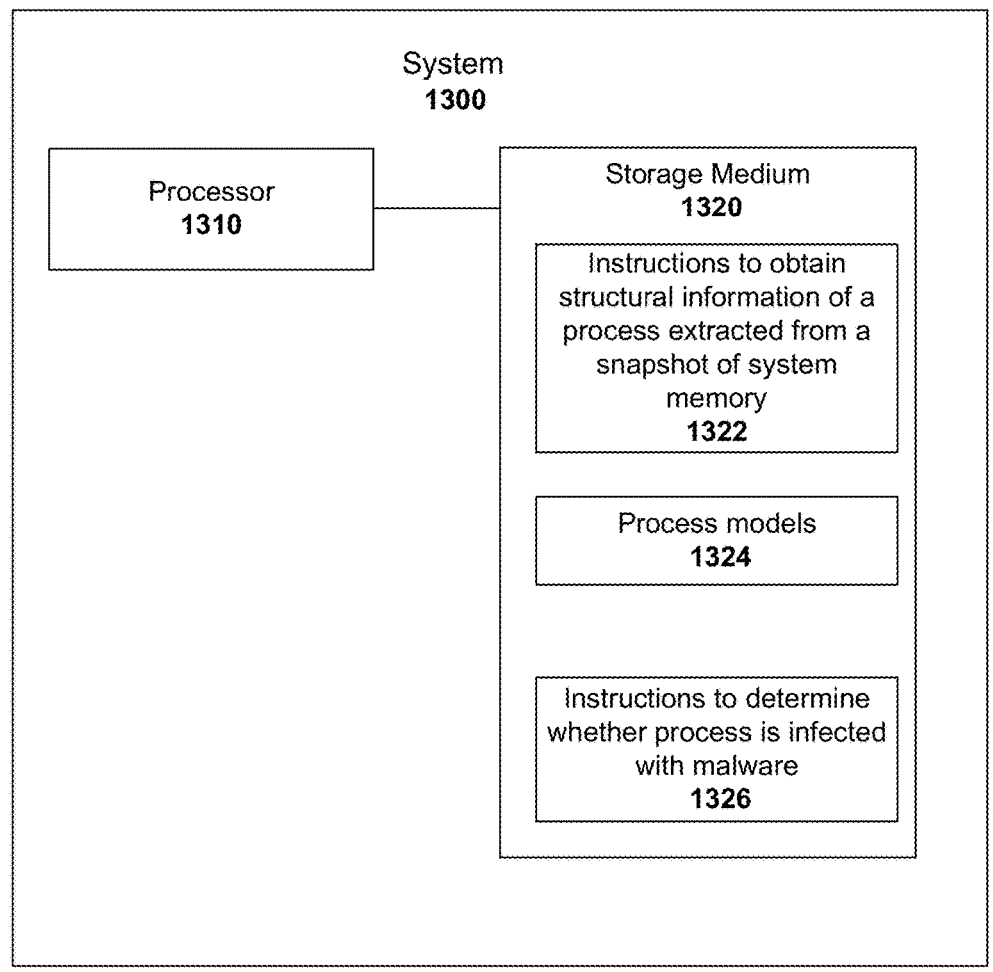
FIG. 13 shows an example system according to the present disclosure.
Figure 14:
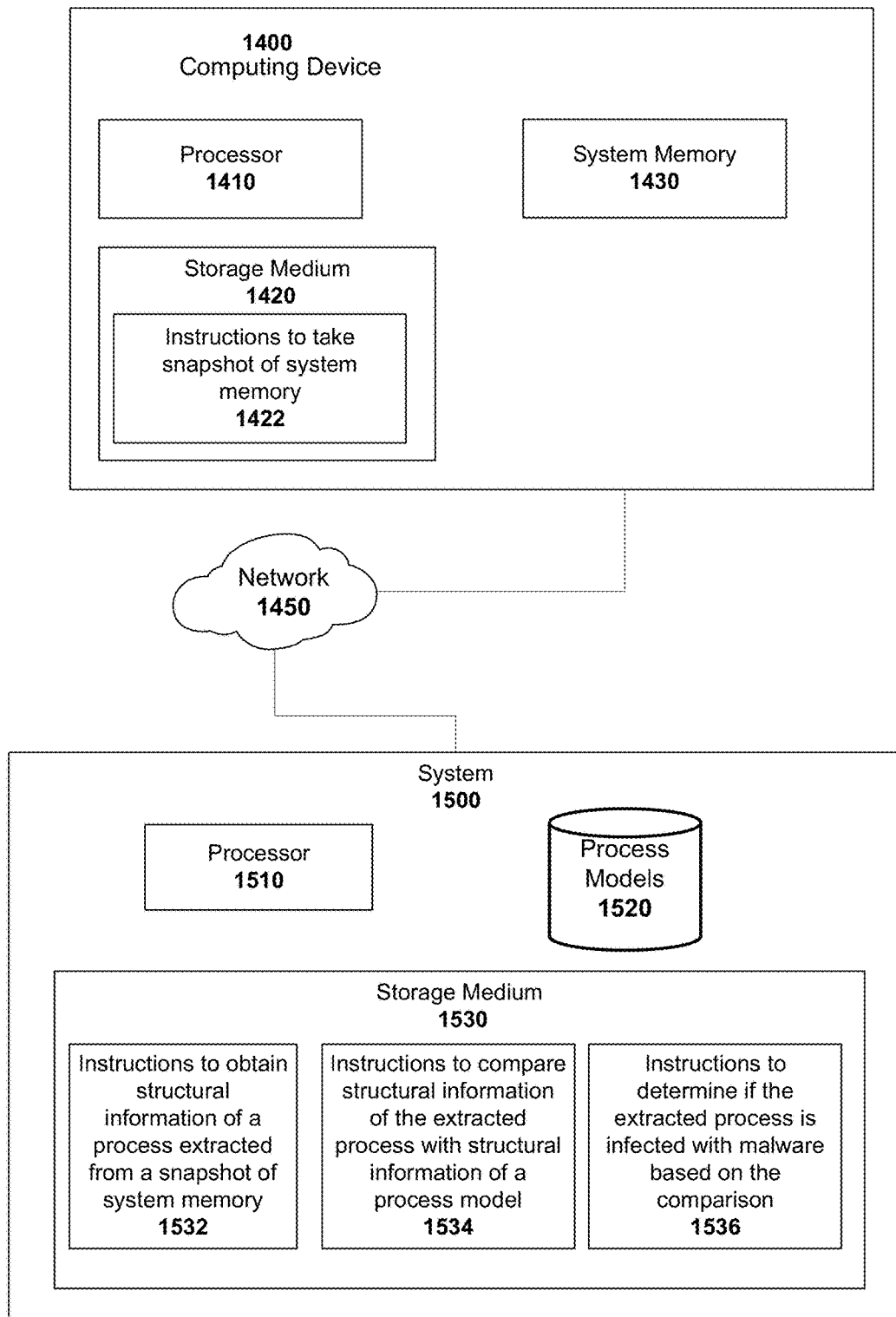
FIG. 14 shows an example of a computer device being examined for malware and a computer system for determining if a process on the computer device is infected with malware according to the present disclosure.

FIGS. 13 and 14 are system diagrams shows examples of computer systems for implementing the methods described herein.

FIG. 13 shows a computer system 1300, which may either be a computer device which is to be examined to determine whether it is infected with malware, or a computer system for detecting whether other computer devices are infected with malware based on information received from the other computer devices. The computer system 1300 which comprises a processor 1310 and a non-transitory computer readable storage medium 1320. The processor may for example be a central processing unit (CPU), microprocessor or other electronic processing device. The storage medium may for example be a hard disk, flash drive, memory, etc. of a computer system.

The storage medium 1320 stores machine readable instructions which may be read and executed by the processor. The instructions may include instructions to perform any of the methods, or any part of the methods disclosed herein. For example, the instructions include a set of instructions 1322 to obtain structural information of a process extracted from a snapshot of system memory. When executed by the processor these instructions cause the process to obtain the structural information, for example by performing the method of block 110 of FIG. 1A. The instructions further include a set of instructions 1326 to determine whether the process is infected with malware, for example by performing the method of any of FIG. 1A, 2A, 4-9, 10A, 10B or 11-12.

The storage medium may further store process models 1324, such as clean process models and/or infected process models as described above. While a single storage medium is shown in FIG. 13 it is to be understood that the instructions and/or process models may be distributed over a plurality of storage mediums. In one example, the instructions may be stored on a storage medium of the computer system 1300, while the process models are stored in a remote location which is accessible by the computer system 1300 over a network.

FIG. 14 shows another example of a computer system which may implement the methods described herein.

A computing device 1400 is a computing device which is being examined to detect the presence of malware. The computing device includes a processor 1410, a non-transitory computer readable storage medium 1420 and a system memory 1430. The computing device may for example be a client computer, personal computer, laptop computer, tablet device, mobile phone, or server etc. The processor may for example be a central processing unit (CPU), microprocessor or other electronic processing device. The storage medium may for example be a hard disk, flash drive or other non-volatile secondary storage the computing device. The system memory 1430 may be a volatile memory, such as random access memory (RAM) for temporarily storing data and executable code to be executed by the processor.

Application programs stored as executable files on the storage medium 1420 may be read into the system memory 1430 by the processor. Application programs read into the system memory 1430 are stored in the system memory as processes and may be executed by the processor. The storage medium stores a set of instructions 1422 to take a snapshot of system memory. The instructions 1422 may be read into the system memory 1430 and executed by the processor to take a snapshot of the system memory. The storage medium 1420 may further store instructions to perform blocks 202-204 of FIG. 2A or the method of FIG. 10B.

Computer system 1500 is connected to computing device 1400 over a network 1450, such as a local area network (LAN), wide area network (WAN), telecommunications network, private cloud, public cloud, the Internet, etc. Computer system 1500 may be implemented on a single computer device or distributed over a plurality of computer devices. Computer system 1500 is to determine whether the computing device 1400 is infected with malware based on information received from the computing device 1400. The information received by the computer system 1500 from the computing device 1400 may include structural information of a process extracted from a snapshot of system memory 1430 on the computing device 1400. In other examples, the information communicated from the computing device 1400 to the computer system 1500 may be a snapshot of system memory 1430 of the computer device 1400, or a process extracted from the system memory 1430 of the computer device 1400, from which the structural information can be derived.

The computer system 1500 includes a processor 1510, a non-transitory machine readable storage medium 1530 and process models 1520 which may be stored on a non-transitory computer readable storage medium or in a remote location accessible to the computer system 1500.

The storage medium 1530 stores machine readable instructions which are executable by the processor 1510 to perform any of the methods described herein. For example, the instructions may include a set of instructions 1532 to obtain structural information of a process extracted from system memory 1430, instructions 1534 to compare structural information of the extracted process with structural information of a process model and instructions 1536 to determine if the extracted process is infected with malware based on the comparison. Thus, the processor may execute the instructions to perform the methods described herein with reference to the accompanying drawings.

All of the features disclosed in this specification (including any accompanying claims, abstract and drawings), and/or all of the blocks of any method so disclosed, may be combined in any combination, except combinations where at least some of such features and/or blocks are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A non-transitory computer readable storage medium storing instructions executable by a processor to:
   obtain structural information of a process extracted from a snapshot of system memory, wherein the structural information of the process extracted from the snapshot of system memory includes a process list of a plurality of processes running in a user space in the system memory, and a module list of executables associated with the plurality of processes running in the user space;
   find a process model corresponding to the process from among a plurality of process models, wherein the process model includes a model of a clean version of the process;
   compare the structural information of the process extracted from the snapshot of system memory with structural information in the process model to detect anomalies in the process, wherein the structural information in the process model includes statistical information on probabilities of occurrence of a plurality of structural features in a clean version of the process, and wherein the instructions to compare the structural information comprise instructions to:
     calculate a degree of similarity utilizing a hash of the process and a hash of the process model; and
     determine if the calculated degree of similarity satisfies a predetermined threshold condition;
   determine an anomaly responsive to a determination that the process includes a structural feature which is not in the process model, or responsive to a determination that the process includes a structural feature which has a low probability of occurrence in the process model, wherein the low probability of occurrence comprises a probability below a predetermined threshold; and
   determine whether the process is infected with malware based on the detected anomalies.

2. The non-transitory computer readable storage medium of claim 1, wherein the instructions to compare the structural information of the process with structural information in the process model are based on at least one of the following: name of executables associated with executable regions of the process and content similarity with executable regions of the process.

3. The non-transitory computer readable storage medium of claim 1, wherein each process model of the plurality of process models includes an identifier, and
   wherein the instructions to find a process model corresponding to the process include instructions to determine an identifier of the process and match the identifier of the process with an identifier of a process model.

4. The non-transitory computer readable storage medium of claim 1, wherein the instructions to compare the structural information of the process with structural information in the process model comprise instructions to compare identifiers of structural features of the process with identifiers of structural features in the process model.

5. The non-transitory computer readable storage medium of claim 4, wherein the hash of the process and the hash of the process model comprise hashes or fuzzy hashes of the structural features of the process and the process model.

6. The non-transitory computer readable storage medium of claim 1, wherein there are a plurality of process models, and
   wherein the instructions to compare the structural information of the process with structural information in the process model comprise instructions to compare an executable of the extracted process with content clusters in the process model based on a measure of content similarity.

7. The non-transitory computer readable storage medium of claim 1, including instructions to generate an alert responsive to a determination that an executable region of the process is matched inconsistently between two different types of process model.

8. The non-transitory computer readable storage medium of claim 1, including instructions to determine a total number of structural features of the process and generate an alert responsive to determining that the total number of structural features differs from an average number of structural features indicated in the process model by more than a second predetermined threshold.

9. The non-transitory computer readable storage medium of claim 1, wherein structural information of the process includes a determined entropy of code of the process, and
   wherein the instructions to compare the structural information of the process with structural information in the process model comprise instructions to compare the determined entropy with entropy information included in the process model and instructions to generate an alert responsive to determining that the determined entropy differs from the entropy information by more than a third predetermined threshold.

10. The non-transitory computer readable storage medium of claim 1 further comprising instructions to:
    extract, from the snapshot, an executable associated with an executable region of a process;
    determine a pathname from which the extracted executable was loaded according to metadata in the snapshot;
    compare at least a portion of content of the executable at the pathname with at least a portion of content of the extracted executable; and generate an alert responsive to determining that a difference between the executable at the pathname and the extracted executable is indicative of a hook to a malware executable.

11. A method of detecting malware by a computer system comprising:
obtaining information relating to executable regions of a process extracted from system memory, the information extracted from the system memory including a process list of a plurality of processes running in a user space in the system memory, and a module list of executables associated with the plurality of processes running in the user space;
finding a process model which matches the extracted process, the process model representing a clean version of the process and including identifiers of executables and probabilities of occurrence of the executables in the clean version of the process, wherein information relating to executable regions in the process model include statistical information on probabilities of occurrence of a plurality of structural features in the clean version of the process;
matching the executable regions of the extracted process, using the information extracted from the system memory, with the executables in the process model based on the identifiers;
calculating a degree of similarity utilizing a hash of the process and a hash of the process model and determining if the calculated degree of similarity satisfies a predetermined threshold condition; and
making a determination whether the process is infected with malware based on whether the executable regions in the process match executables in the process model and the probabilities of occurrence of the executables in the process model, wherein the determination whether the process is infected with malware is based on at least one of the following: presence of executable regions in the extracted process which do not match with executables in the process model, presence of executable regions in the process which match executables having a low probability of occurrence in the process model, wherein the low probability of occurrence comprises a probability below a first predetermined threshold, or executables which have a high probability of occurrence in the process model not being matched with any executable regions of the process; wherein the high probability of occurrence comprises a probability above a second predetermined threshold.

12. The method of claim 11 further comprising comparing the extracted process with a process model representing an infected version of the process, and wherein the determination is based on comparing the extracted process to both the process model representing the infected version of the process and the process model representing the clean version of the process.

13. The method of claim 11 wherein matching executable regions in the extracted process with executables in the process model is based on names of the executables and the executable regions.

14. The method of claim 11 wherein obtaining information relating to executable regions of a process extracted from system memory comprises taking a snapshot of system memory, extracting at least executable regions of the process from the snapshot and determining identifiers of the executable regions.

15. A non-transitory computer readable storage medium storing instructions executable by a processor to:
obtain structural information of a process extracted from a snapshot of system memory, the snapshot of system memory including a process list of a plurality of processes running in a user space in the system memory, and a module list of executables associated with the plurality of processes running in the user space;
make a comparison of the structural information of the extracted process extracted from the snapshot of system memory with structural information of a clean process model representing a clean version of the process and an infected process model representing an infected version of the process, wherein the structural information of the clean process model includes statistical information on probabilities of occurrence of a plurality of structural features in the clean version of the process, and wherein the instructions to make a comparison of the structural information comprises instructions to:
  calculate a degree of similarity utilizing a hash of the process and a hash of the clean process model; and
  determine if the calculated degree of similarity satisfies a predetermined threshold condition; and
determine whether the process is infected with malware based on the comparison, wherein the instructions to determine whether the process is infected with malware comprises instructions to make a determination based on whether structural features of the extracted process are matched with structural features in the clean process model or the infected process model, and respective probabilities of occurrence of the matched structural features in the clean process model and the infected process model.

16. The computer readable storage medium of claim 15, wherein the instructions to make a comparison comprise instructions to match structural features of the process with structural features in the process models based on identifiers of the structural features of the extracted process and identifiers of the structural features in the clean process model and the infected process model.

* * * * *